J. W. VAN ZILE.
NUT LOCK.
APPLICATION FILED DEC. 29, 1914.
1,158,340.
Patented Oct. 26, 1915.
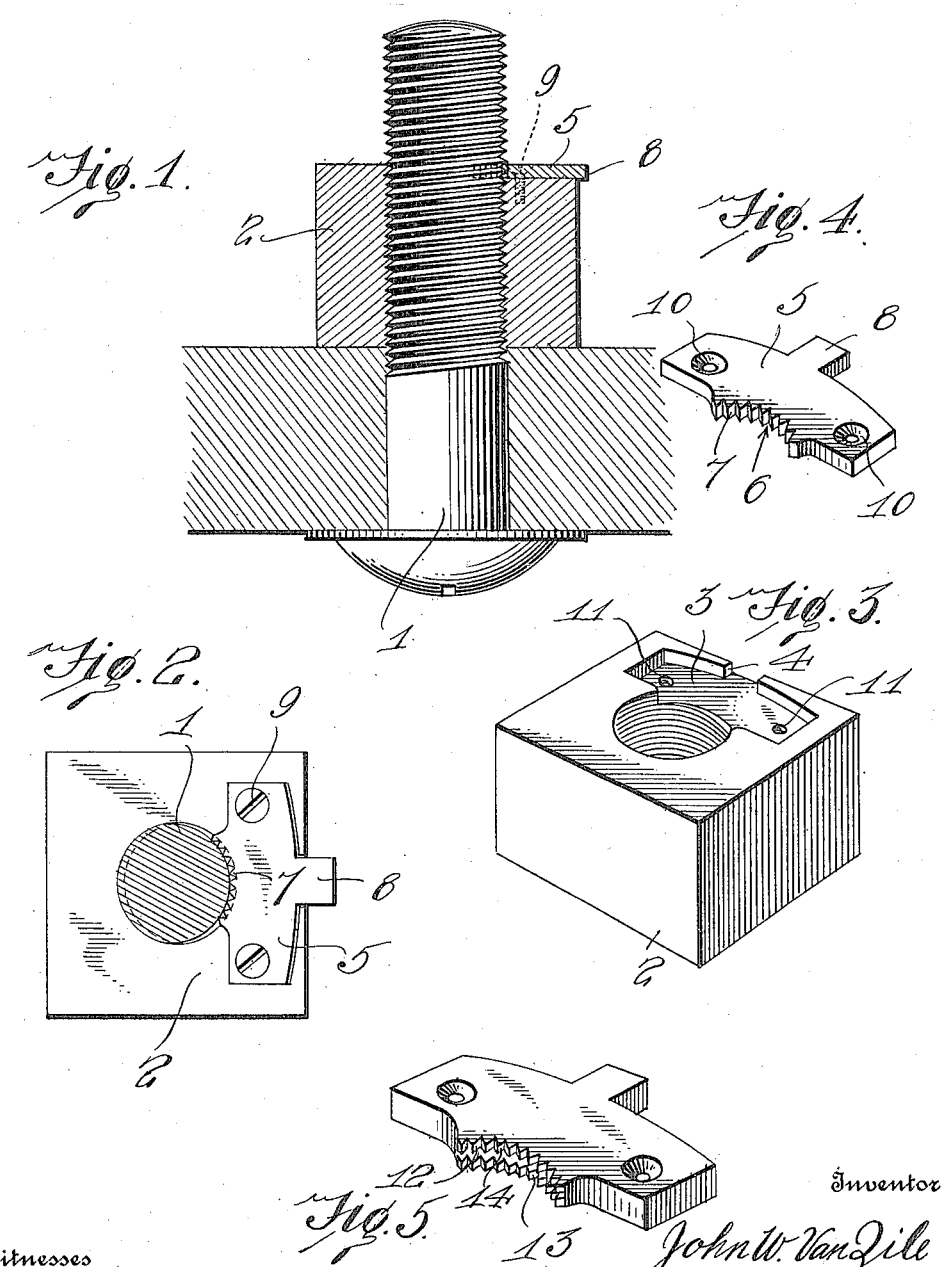

UNITED STATES PATENT OFFICE.

JOHN W. VAN ZILE, OF HOHOKUS, NEW JERSEY.

NUT-LOCK.

1,158,340.   Specification of Letters Patent.   Patented Oct. 26, 1915.

Application filed December 29, 1914. Serial No. 879,519.

*To all whom it may concern:*

Be it known that I, JOHN W. VAN ZILE, a citizen of the United States, residing at Hohokus, in the county of Bergen and State of New Jersey, have invented certain new and useful Improvements in Nut-Locks, of which the following is a specification.

This invention relates to nut locks, and more particularly to that class of nut locks in which the locking operation is accomplished by means of a toothed key.

An object of the invention is to provide a nut lock which is applicable to standard size nuts with but slight alteration thereto, and which is readily applied and detached, and also capable of being repeatedly used.

With the foregoing and other objects in view the invention consists in the novel features of construction, combination and arrangement of parts as will be hereinafter more fully described, illustrated in the accompanying drawings and claimed.

In the drawings:—Figure 1 is a sectional view of a nut applied to a bolt and showing the improved locking means fastened thereto; Fig. 2 is a plan view showing the bolt in section; Fig. 3 is a perspective view of the nut; Fig. 4 is a perspective view of the locking key; Fig. 5 is a perspective view of a modified form of locking key.

Referring to the drawings by numerals, 1 designates a bolt which is adapted to threadedly receive a nut 2. This nut may be of any ordinary construction and is provided on the upper face thereof with a recess 3. This recess is disposed to one side of the bore of the nut and opens thereinto. The recess further extends to a point adjacent the opposite sides of the nut, and adjacent the edge of the nut which is opposite to the point of communication with the bore is provided with an opening 4 which forms a means of communication between the recess and the side of the nut.

A locking key 5 is adapted to be seated in the recess 3, is of slightly less width than the recess and on the inner face thereof is provided with an arcuately shaped recess 6, this recess is of a curvature extending to the curvature of the bolt and is provided with teeth 7 for engagement with the bolt when the key and nut are applied thereto. A lug 8 is formed on the key opposite to the teeth 7 and is adapted to extend through the opening 4 in the nut 2, this lug being adapted to be struck by a hammer or other tool to force the teeth 7 into engagement with the threads of the bolt. After the key has been driven into engagement with the threads of the bolt, screws or other suitable fastening elements 9 may be passed through openings 10 in the key and alining openings 11 in the nut in order to prevent accidental disengagement of the key from the nut.

In Fig. 5 of the drawings a modified form of locking key has been shown. This key is of substantially the same construction as the key 5, but is slightly thicker, and instead of the single row of teeth 7, as shown in the preferred form of the drawings, this key is provided with a double row of teeth 12 and 13 respectively, a slot 14 being formed in the arcuately-shaped portion of the key, centrally of the teeth in order to form two rows mentioned.

From the foregoing description taken in connection with the accompanying drawings it is thought that the construction and operation of the device will be clearly understood and while I have herein shown and described one specific form of my invention I do not wish to be limited thereto, except for such limitations as the claim may import.

What is claimed is:—

In combination with a bolt, a nut threaded thereon, said nut having a recess formed therein, said recess being spaced from the outer edges of said nut and communicating with the upper face and the interior bore thereof, a plate seated in said recess, said plate provided with an extension on its edge adjacent the interior bore of said nut, said extension provided with an arcuate cut-out portion, teeth formed in said cut-out portion and normally out of engagement with the threads of said bolt, said nut provided with an opening, communicating with the outer side of said nut, an operating extension formed on said plate opposite to said first mentioned extension and projecting through said opening, said nut provided with spaced apart openings, communicating with said recess, said plate provided with spaced apart openings, said openings in said plate being normally out of registry with the last mentioned openings in said nut, whereby when said plate is operated to force said teeth into engagement with the threads of said bolt, the openings in said plate and the last mentioned openings in said nut will coincide to receive a fastening means substantially as described.

In testimony whereof I affix my signature in presence of two witnesses.

JOHN W. VAN ZILE.

Witnesses:
J. BLAUVELT HOPPER,
CALVIN B. SMITH.